United States Patent
Ha

(10) Patent No.: US 12,275,390 B2
(45) Date of Patent: Apr. 15, 2025

(54) FOUR-WHEEL INDEPENDENT STEERING SYSTEM AND CONTROL METHOD THEREOF

(71) Applicants: Hyundai Motor Company, Seoul (KR); Kia Corporation, Seoul (KR)

(72) Inventor: Dong Hyun Ha, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 326 days.

(21) Appl. No.: 17/840,412

(22) Filed: Jun. 14, 2022

(65) Prior Publication Data
US 2023/0037740 A1    Feb. 9, 2023

(30) Foreign Application Priority Data
Aug. 5, 2021    (KR) .......................... 10-2021-0102959

(51) Int. Cl.
*B60W 10/20*    (2006.01)
*B60W 10/22*    (2006.01)
(Continued)

(52) U.S. Cl.
CPC ............ *B60W 10/20* (2013.01); *B60W 10/22* (2013.01); *B62D 1/187* (2013.01); *B62D 7/1509* (2013.01); *B62D 1/04* (2013.01)

(58) Field of Classification Search
CPC ....... B60W 10/20; B60W 10/22; B62D 1/187; B62D 7/1509; B62D 1/04; B62D 1/10;
(Continued)

(56) References Cited

U.S. PATENT DOCUMENTS 3,856,102 A * 12/1974 Queen .................. B62D 7/1509
180/236
5,347,458 A *  9/1994 Serizawa ............... B62D 5/006
701/41
(Continued)

FOREIGN PATENT DOCUMENTS

DE    102005019487 B4 *  2/2009 ........... B62D 7/1509
JP    2013-056581    3/2013
(Continued)

OTHER PUBLICATIONS

Smith, F., "Here's How Mercedes-AMG F1's Dual-Axis Steering Worked", Dec. 14, 2020, Road & Track, https://www.roadandtrack.com/news/a34962680/mercedes-amg-f1-dual-axis-steering-explained/ (Year: 2020).*

*Primary Examiner* — Abby Y Lin
*Assistant Examiner* — Karston G. Evans
(74) *Attorney, Agent, or Firm* — Morgan, Lewis & Bockius LLP

(57) ABSTRACT

A four wheel independent steering system and the control method thereof is configured to implement an interface provided for independently steering four wheels and an operating mechanism thereof, and the four-wheel independent steering system includes a motion module configured for implementing steering motions by a tilting operation of a steering wheel, and a controller configured to detect a steering signal corresponding to one of the steering motions, and to control steering movement or suspension movement of four wheels based on the detected steering signal.

25 Claims, 22 Drawing Sheets

(51) Int. Cl.
   *B62D 1/187* (2006.01)
   *B62D 7/15* (2006.01)
   *B62D 1/04* (2006.01)

(58) Field of Classification Search
   CPC .......... B62D 1/02; B62D 5/006; B62D 6/002; B62D 7/14; B62D 15/024; B60G 17/015; B60Y 2400/3012
   See application file for complete search history.

(56) References Cited

U.S. PATENT DOCUMENTS

| | | | | |
|---|---|---|---|---|
| 5,503,240 | A * | 4/1996 | Hong | B62D 5/0433 180/446 |
| 5,623,818 | A * | 4/1997 | Ledbetter | B62D 61/00 280/99 |
| 6,079,513 | A * | 6/2000 | Nishizaki | B62D 15/0235 701/41 |
| 9,733,842 | B2 | 8/2017 | Sudo et al. | |
| 10,029,728 | B2 | 7/2018 | Yanez | |
| 10,787,192 | B1 | 9/2020 | Katzourakis | |
| 10,913,491 | B2 | 2/2021 | Lesbirel et al. | |
| 2001/0000432 | A1 * | 4/2001 | Farley | G01D 5/2013 340/576 |
| 2002/0109310 | A1 * | 8/2002 | Lim | B60G 17/015 280/5.508 |
| 2005/0021190 | A1 * | 1/2005 | Worrell | B60K 35/00 701/1 |
| 2006/0237242 | A1 * | 10/2006 | Burke | B62D 31/025 180/65.265 |
| 2008/0017436 | A1 * | 1/2008 | Dower | B62D 7/1509 180/402 |
| 2012/0109463 | A1 * | 5/2012 | Elkins | B62D 15/0215 701/42 |
| 2012/0277954 | A1 * | 11/2012 | Kimura | B62D 6/008 701/41 |
| 2015/0134202 | A1 * | 5/2015 | Dawson | B60K 17/356 701/41 |
| 2016/0379389 | A1 * | 12/2016 | Fukada | B62D 15/02 345/589 |
| 2017/0108411 | A1 * | 4/2017 | Komuro | G01D 5/2451 |
| 2018/0327022 | A1 * | 11/2018 | Schaeding | B62D 9/00 |
| 2020/0238995 | A1 * | 7/2020 | Imamura | B60W 30/1886 |
| 2020/0257288 | A1 * | 8/2020 | Tsay | B60K 35/00 |

FOREIGN PATENT DOCUMENTS

| | | |
|---|---|---|
| JP | 6534071 | 5/2016 |
| KR | 10-1995-0004310 B1 | 4/1996 |
| KR | 10-1004957 | 12/2010 |
| KR | 10-1668248 | 10/2016 |
| KR | 10-2019-0078662 | 7/2019 |
| KR | 10-2019-0115845 | 10/2019 |

* cited by examiner

FIG. 17A
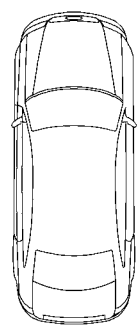
FIG. 17B
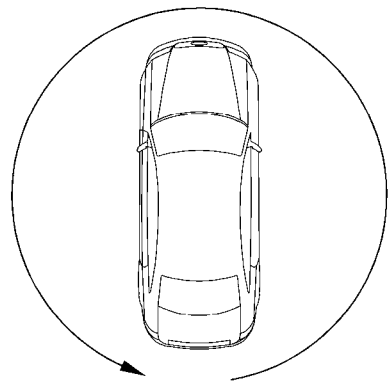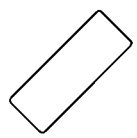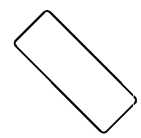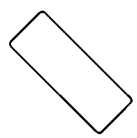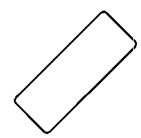

50mm UP

FOUR-WHEEL INDEPENDENT STEERING SYSTEM AND CONTROL METHOD THEREOF

CROSS REFERENCE TO RELATED APPLICATION

The present application claims priority to Korean Patent Application No. 10-2021-0102959, filed Aug. 5, 2021, the entire contents of which is incorporated herein for all purposes by this reference.

BACKGROUND OF THE PRESENT DISCLOSURE

Field of the Present Disclosure

The present disclosure relates to a four-wheel independent steering system and a control method thereof, which implement an interface provided for independently steering four wheels and an operating mechanism thereof.

Description of Related Art

A conventional vehicle is designed to steer wheels in only two modes (straight, left/right turn), so a driver drives intuitively using only a small number of control systems. In contrast, a four-wheel independently steering system (4WS) independently controls each wheel, and thus generating various vehicle movements.

Recently, hardware development related to the 4WS has been intensively progressed, but a steering mechanism or an operating mechanism that can mechanically manipulate and control the movements of the 4WS is lacking.

A structure of the user interface for independently steering the four wheels is lacking, and the technical and control scenarios that steer the four wheels in different directions are also lacking.

Therefore, to realize and mass-produce the 4WS, it is necessary to have the user interface and the operating mechanism that can freely operate four wheels.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a four-wheel independent steering system and a control method thereof, which can implement an interface and an operating mechanism for independently steering four wheels.

In various aspects of the present disclosure, there is provided a four-wheel independent steering system including: a motion module configured for implementing steering motions by a tilting operation of a steering wheel; and a controller configured to detect a steering signal corresponding to one of the steering motions, and to control steering movement or suspension movement of four wheels based on the detected steering signal.

The steering motions may include at least one of a rolling motion and a pitching motion of the steering wheel with respect to a steering column.

The four-wheel independent steering system may include: magnetic bodies provided in one of the steering wheel and the steering column and magnetic field detectors provided in another of the steering wheel and the steering column, wherein the magnetic bodies and the magnetic field detectors are disposed to be adjacent to each other, wherein the controller may be configured to detect the steering signal based on a magnetic field change detected by the magnetic field detectors in response to a distance change between the magnetic bodies and the magnetic field detectors caused by the steering motions of the steering wheel.

The magnetic field detectors may be fixed to an external surface of the steering column; and the magnetic bodies may be provided on an internal surface of a lower end portion of the steering wheel which may be formed in a shape that encompasses the magnetic field detectors.

The magnetic bodies and the magnetic field detectors may be respectively include at least two magnetic bodies and two magnetic field detectors in a circumferential direction based on a shaft of the steering wheel and the steering column.

All the magnetic bodies may have different sizes from each other.

The motion module may be disposed between the steering wheel and a steering shaft and connected to the steering wheel and the steering shaft while relative rotation thereof may be restricted; and the steering shaft may include a reaction motor to supply a reaction torque to the steering wheel.

The motion module may include: a module housing fixed to an upper end portion of the steering shaft; a first motion member fixed to a lower end portion of the steering wheel to implement the steering motions; the second motion member in which left and right portions of the first motion member may be inserted into left and right portions thereof and front and rear portions thereof may be inserted into front and rear portion of the module housing, allowing a forward and rearward pitching motion of the first motion member with respect to the module housing; and a third motion member in which front and rear portions of the first motion member may be inserted into front and rear portions thereof, and left and right portions thereof may be inserted into left and right portions of the module housing, allowing a leftward and rightward rolling motion of the second motion member with respect to the module housing.

The four-wheel independent steering system may include: a stopper provided in a direction in which the steering wheel may perform the steering motion, and preventing a collision between the steering wheel and the motion module during a steering motion process of the steering wheel.

The four-wheel independent steering system may include: return springs configured to provide an elastic restoring force in a direction in which the steering wheel may perform the steering motion.

The return springs may be connected to the steering wheel and the motion module while being located therebetween.

The four-wheel independent steering system may include: motion switches configured to activate a function of one of the steering motions, wherein the controller may be configured to control the steering movement or the suspension movement of the four wheels in response to the steering signal detected due to the steering motion while the function of the steering motion is activated.

The motion switches may be provided at left and right portions of the steering wheel.

In a case of a steering motion in which the steering wheel is operated in leftward and rightward rolling motions, the four wheels may be aligned leftward and rightward; and when the function of the steering motion is deactivated, the four wheels may be steered and restored to an initial alignment thereof.

In a steering motion in which the steering wheel is operated in the rolling and pitching motions in a forward diagonal direction while the function of the steering motion is activated, the four wheels may be aligned in the forward diagonal direction; and when the function of the steering motion is deactivated, the four wheels may be steered and restored to an initial alignment thereof.

When the steering wheel is rotated while the function of the steering motion is activated, the four wheels may be steered to enable a vehicle to be rotated in place; and when the function of the steering motion is deactivated, the four wheels may be steered and restored to an initial alignment thereof.

In a steering motion in which the steering wheel is operated in the pitching motion in a first direction while the function of the steering motion is activated, a suspension may be raised and thus increase vehicle ground clearance; and in a steering motion in which the steering wheel is operated in the pitching motion in a second direction while the function of the steering motion is activated, a suspension may be lowered and thus lowers vehicle ground clearance.

When the function of the steering motion is activated, a present steering or suspension state of the four wheels and a vehicle driving state may be displayed on a display device.

In the steering motion of the steering wheel, an expected steering or suspension state of the four wheels and an expected vehicle driving state that reflect the steering motion may be displayed on a display device.

In various aspects of the present disclosure, there is provided a four-wheel independent steering system including a motion module connected to a steering wheel and a steering shaft while being disposed therebetween and restricting relative rotation thereof, and configured to implement steering motions by a tilting operation of the steering wheel; a steering column encompassing the steering shaft; magnetic bodies provided at one of the steering wheel and the steering column and magnetic field detectors provided at another of the steering wheel and the steering column, wherein the magnetic bodies and the magnetic field detectors are adjacent to each other; and a reaction motor provided in the steering shaft to provide a reaction torque to the steering wheel.

According to an exemplary embodiment of the present disclosure, a method of controlling a four-wheel independent steering system may include: determining, by a controller, whether a function of a steering motion is activated; detecting a steering signal, by the controller, wherein when the function of the steering motion is determined to be activated, the steering signal in response to the steering motion occurring by a tilting operation of a steering wheel may be detected; controlling a movement, by the controller, wherein when the steering signal is detected due to the steering motion, a steering movement or a suspension movement of four wheels may be controlled based on the detected steering signal.

When the function of the steering motion is activated, a present steering or suspension state of the four wheels and a vehicle driving state may be displayed on a display device.

In the steering motion of the steering wheel while the function of the steering motion is activated, an expected steering or suspension state of the four wheels and an expected vehicle driving state that reflect the steering motion may be displayed on the display device.

The detecting the steering signal may be performed by detecting, by the controller, a steering signal based on a magnetic field change detected by the magnetic field detector in response to a distance change between magnetic bodies and magnetic field detectors caused by the steering motion of the steering wheel.

The detecting the steering signal may include: securing, by magnetic field detectors fixed to the steering column, magnetic field strength of magnetic bodies provided in the steering wheel; and detecting a steering signal, by the controller, in a steering motion of the steering wheel, detecting the steering signal corresponding to the steering motion based on a steering angle and a magnetic field strength change of the magnetic bodies.

The controller may detect the steering signal with respect to the steering motion by a steering motion magnetic field map.

When the function of the steering motion is deactivated, the controller does not detect a steering signal with respect to the steering motion.

As described above, according to an exemplary embodiment of the present disclosure, the steering operation for generating various vehicle movements is implemented by additional steering operations such as the rolling motion and the pitching motion of the steering wheel. Therefore, the interface suitable for the four-wheel independent steering system may be implemented so that the convenience of the steering operation and productivity of a vehicle may be improved.

A steering state of the four wheels and a vehicle driving state in response to according to the steering motions are displayed for the driver, so that the productivity may be further improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 17A and FIG. 17B are views showing screens displayed on the HUD in the function activation state and the steering motion operation state according to FIG. 15.

Figure 1:
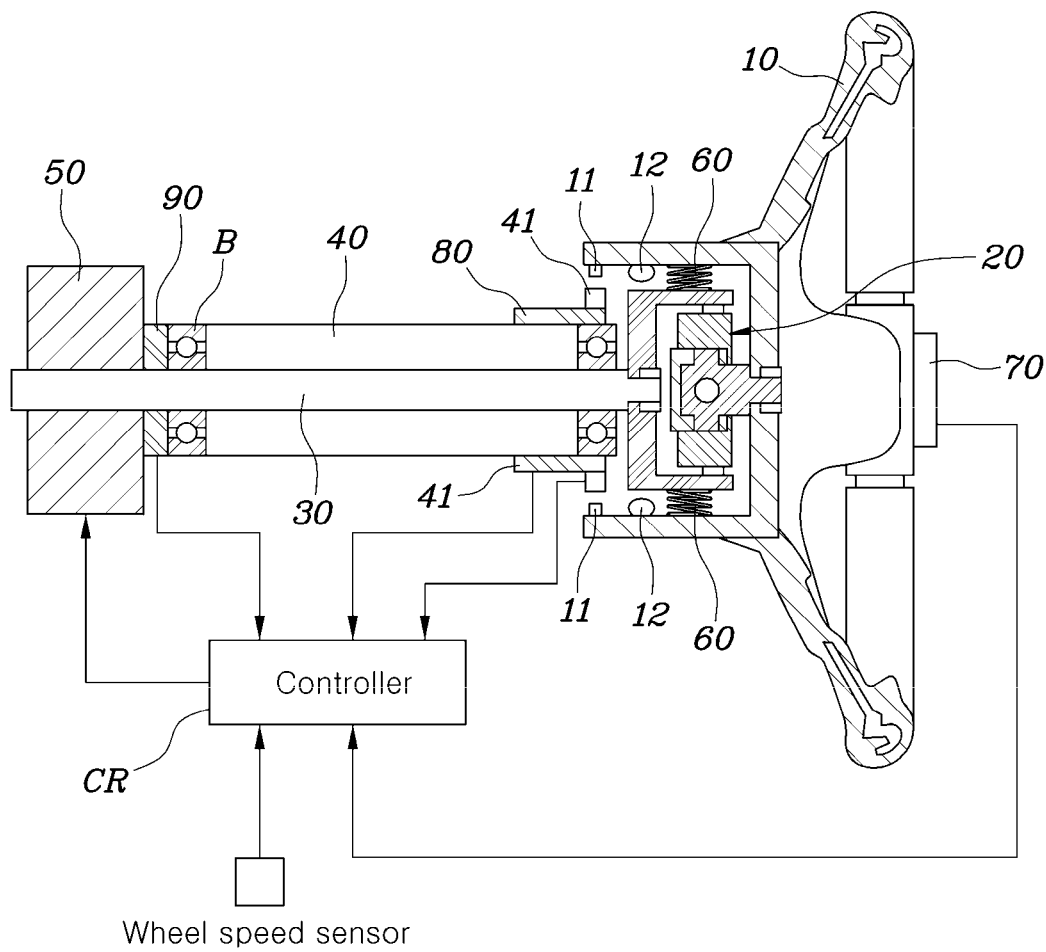
FIG. 1 is a view showing a structure of a four-wheel independent steering system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, exemplary embodiments of the present disclosure will be described in detail with reference to accompanying drawings.

Figure 2:
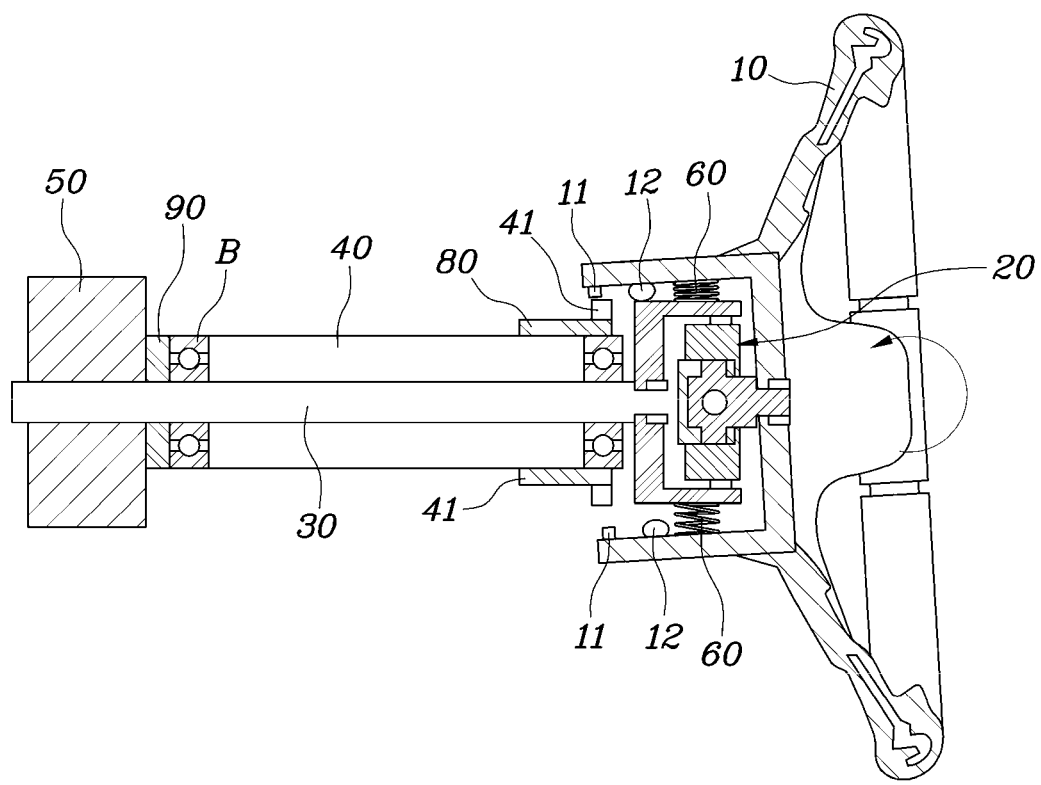
FIG. 2 is a view showing an operation in response to a pitching motion of a steering wheel in FIG. 1.
Figure 3:
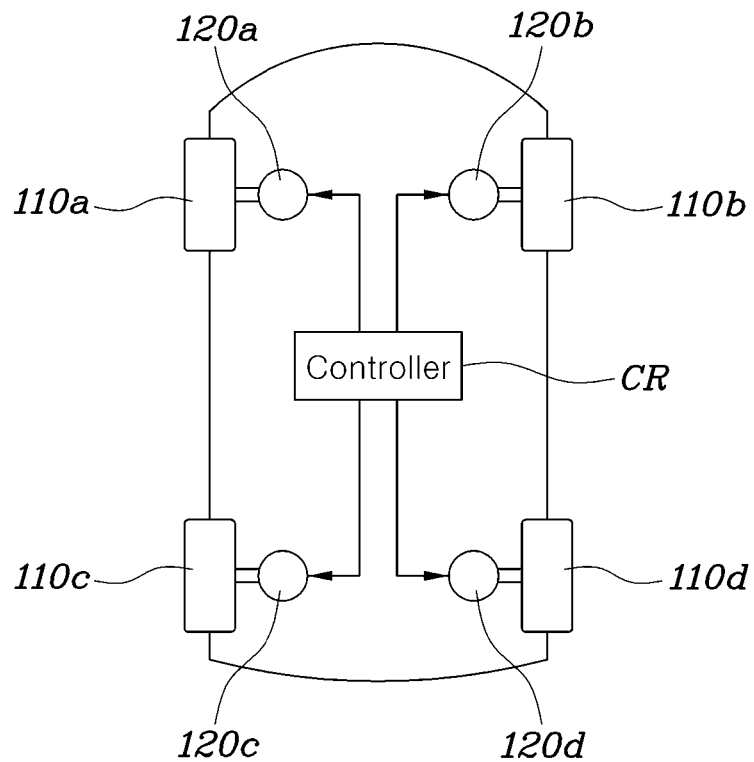
FIG. 3 is a view conceptually showing a road wheel actuator steering four wheels according to an exemplary embodiment of the present disclosure.

FIG. 1 is a view showing a structure of a four-wheel independent steering system according to an exemplary embodiment of the present disclosure. FIG. 2 is a view showing an operation in response to a pitching motion of a steering wheel 10 in FIG. 1. FIG. 3 is a view conceptually showing road-wheel actuators 120 steering four wheels 110 according to an exemplary embodiment of the present disclosure.

Referring to the drawings, the four-wheel independent steering system of the present disclosure includes: a motion module 20 implementing steering motions including at least one of a rolling motion and a pitching motion of the steering wheel 10; and a controller CR detecting a steering signal in response to one of the steering motions, and controlling a steering movement or a suspension movement of the four wheels 110 based on the detected steering signal.

The four-wheel independent steering system is configured so that the motion module 20 mechanically allows the rolling and pitching motions of the steering wheel 10. The controller CR may recognize a steering motion direction of the steering wheel 10, and apply an operation signal to the road-wheel actuators 120 to provide a steering torque to the four wheels 110, or apply the operation signal to the suspension.

As an exemplary embodiment of the present disclosure, the road-wheel actuators 120 (120a, 120b, 120c, 120d) are respectively provided at the four wheels 110 (110a, 110b, 110c, 110d) including front left and right wheels and rear left and right wheels. Therefore, the road-wheel actuators 120 may independently steer the four wheels 110 (110a, 110b, 110c, 110d) in response to the operation signal applied from the controller CR.

In the conventional steering wheel, only rotational operation thereof on a steering shaft is possible, so that the front wheels are steered. However, in an exemplary embodiment of the present disclosure, in addition to rotational operation of the steering wheel on a steering shaft 30, the steering wheel 10 may be operated in leftward and rightward rolling directions and forward and rearward pitching directions to implement a steering motion. The vehicle movement may be controlled by detecting the steering signal in response to the steering motion.

As descried above, the steering operation for generating various vehicle movements is implemented through an additional steering operation of the steering wheel 10. Therefore, convenience of the steering operation may be improved by implementing an interface suitable for the four-wheel independent steering system.

Furthermore, the present disclosure is configured to detect the steering motions of the steering wheel 10 using the magnetic field of magnetic bodies 11.

Therefore, the present disclosure includes: the magnetic bodies 11 and magnetic field detectors 41 respectively provided in the steering wheel 10 and a steering column 40, and provided to be close to each other.

The controller CR may detect the steering signal based on a magnetic field change detected by the magnetic field detectors 41 in response to a distance change between the magnetic bodies 11 and the magnetic field detectors 41 caused by the steering motions of the steering wheel 10.

When a physical distance between the magnetic bodies 11 and the magnetic field detectors 41 is changed in response to the rotational steering operation in addition to the steering motion operation of the steering wheel 10, the magnetic field strength detected by the magnetic field detectors 41 is changed. Therefore, the steering signal corresponding to the steering operation of the steering wheel 10 may be detected based on the changed magnetic field.

Figure 4:
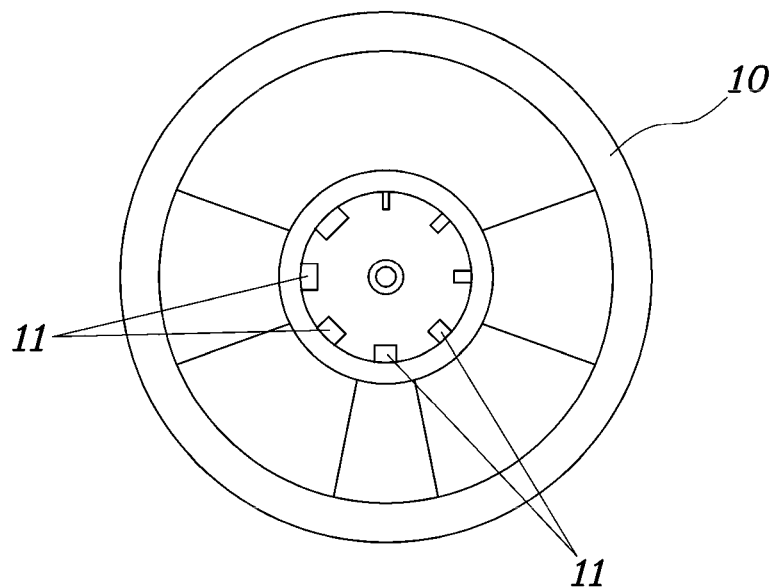
FIG. 4 is a view showing an arrangement of magnetic bodies according to an exemplary embodiment of the present disclosure.

FIG. 4 is a view showing an arrangement of the magnetic bodies 11 according to an exemplary embodiment of the present disclosure.

Referring to FIGS. 1 and 4, in describing the coupling structure between the magnetic bodies 11 and the magnetic field detectors 41, the magnetic field detectors 41 are fixed to an external surface of the steering column 40; and the magnetic bodies 11 are provided on an internal surface of a lower end portion of the steering wheel 10 which is formed in a shape encompassing the magnetic field detectors 41.

At least two magnetic bodies 11 and at least two magnetic field detectors 41 may be disposed at an isometric angle in a circumferential surface on a shaft of the steering wheel 10 and the steering column 40.

The steering column 40 is fixed in a shape that encompasses the steering shaft 30. The magnetic field detectors 41 are fixed along an external circumferential surface of an upper end portion of the steering column 40.

Each of the magnetic field detectors 41 is a 3-D magnetic field detector detecting the magnetic field strength using Hall effect. When necessary, the magnetic field detectors 41 may include a ID magnetic field detector.

Two magnetic field detectors 41 may be provided at an interval of 180°, four magnetic field detectors 41 may be provided at intervals of 90°, or eight magnetic field detectors 41 may be provided at intervals of 45° for precise position and the magnetic field strength recognition.

Furthermore, each of the magnetic bodies 11 may be a magnetic or a magnetic monopole. As a groove is formed on a center portion of the lower end portion of the steering wheel 10, the magnetic bodies 11 may be fixed along an internal circumferential surface of the groove of the steering wheel 10.

The magnetic bodies 11 may be formed to have the same size. Otherwise, the magnetic bodies 11 may be formed to have different sizes from each other.

The steering angle of the steering wheel 10 is determined by the magnitude of the magnetic field, so that the magnetic bodies 11 may be used as dual safety device when a steering detector 80 is broken. The above operation will be described below again.

For example, the steering detector 80 may be provided on the upper end portion of the steering column 40 to detect the steering angle of the steering wheel 10. A torque detector 90 may be provided on a lower end portion of the steering shaft 30 to detect a steering torque of the steering wheel 10.

Figure 5:
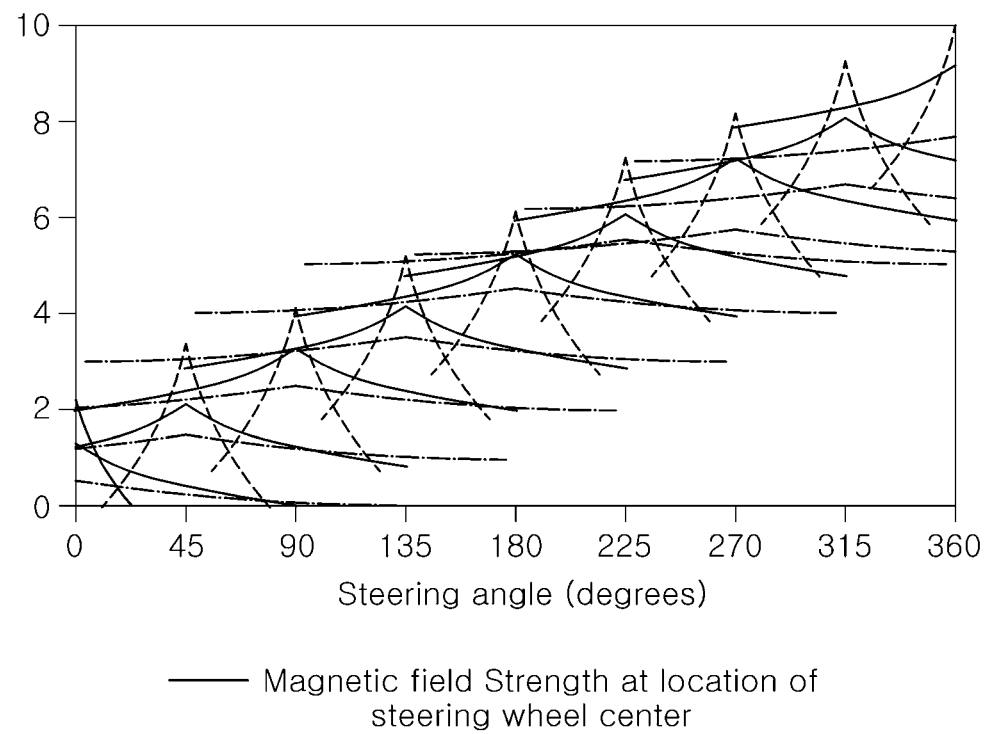
FIG. 5 is a view showing strength of magnetic field for each rotation angle of the steering wheel according to an exemplary embodiment of the present disclosure.

FIG. 5 is a view showing strength of magnetic field for each rotation angle of the steering wheel 10 according to an exemplary embodiment of the present disclosure.

Determining a principle detecting the steering motions of the steering wheel 10 by the magnetic field detector 41 with reference to the drawing, based on the magnetic field strength in a state without the rolling and pitching motions of the steering wheel 10, when the magnetic bodies 11 are close to the magnetic field detectors 41, the magnetic field strength is increased. When the magnetic bodies 11 are far away from the magnetic field detectors 41, the magnetic field strength is weakened.

Therefore, the steering motions according to the rolling and pitching motions of the steering wheel 10 may be detected while the magnetic field strength is increased or reduced for each of the magnetic field detectors 41 in response to a distance change between the magnetic field detectors 41 and the magnetic bodies 11 in response to movement of the magnetic bodies 11.

Therefore, the detected magnetic field strength is applied to a magnetic field map, so that the steering motion of the steering wheel 10 may be detected.

Furthermore, in a case of the steering motion in response to a yawing motion (rotation) of the steering wheel 10, a rotation angle of the steering wheel 10 may be recognized by the steering detector 80. Therefore, the yawing motion of the steering wheel 10 may be detected without detecting the magnetic field strength change.

However, when the steering detector 80 is broken in a self-driving mode or a SBW system, driving may be impossible due to malfunction of the steering detector 80.

In the instant case, in the structure in which sizes of the magnetic bodies 11 are set differently from each other, the steering angle is determined using the magnetic field strength change detected by the magnetic field detectors 41. Therefore, the structure may be used as the dual safety device as a fail safety function of the steering device is applied thereto, and furthermore, the yawing motion of the steering wheel 10 may be detected.

Referring to FIG. 1, the motion module 20 is connected to a portion between the steering wheel 10 and the steering shaft 30 while relative rotation is restricted. A reaction motor 50 is provided at the steering shaft 30 to provide the reaction torque to the steering wheel 10.

The motion module 20 is coupled to a lower portion of the steering wheel 10 and the steering shaft 30 is coupled to a lower end portion of the motion module 20.

Therefore, when the steering wheel 10 is rotated, the motion module 20 and the steering shaft 30 are restrictively rotated. Therefore, the reaction torque supplied from the reaction motor 50 is supplied to the steering wheel 10 through the motion module 20.

For example, and the reaction torque may be generated based on a vehicle speed detected by a wheel speed detector 100 and a steering angle and a steering angular speed detected by the steering detector 80.

Figure 6:
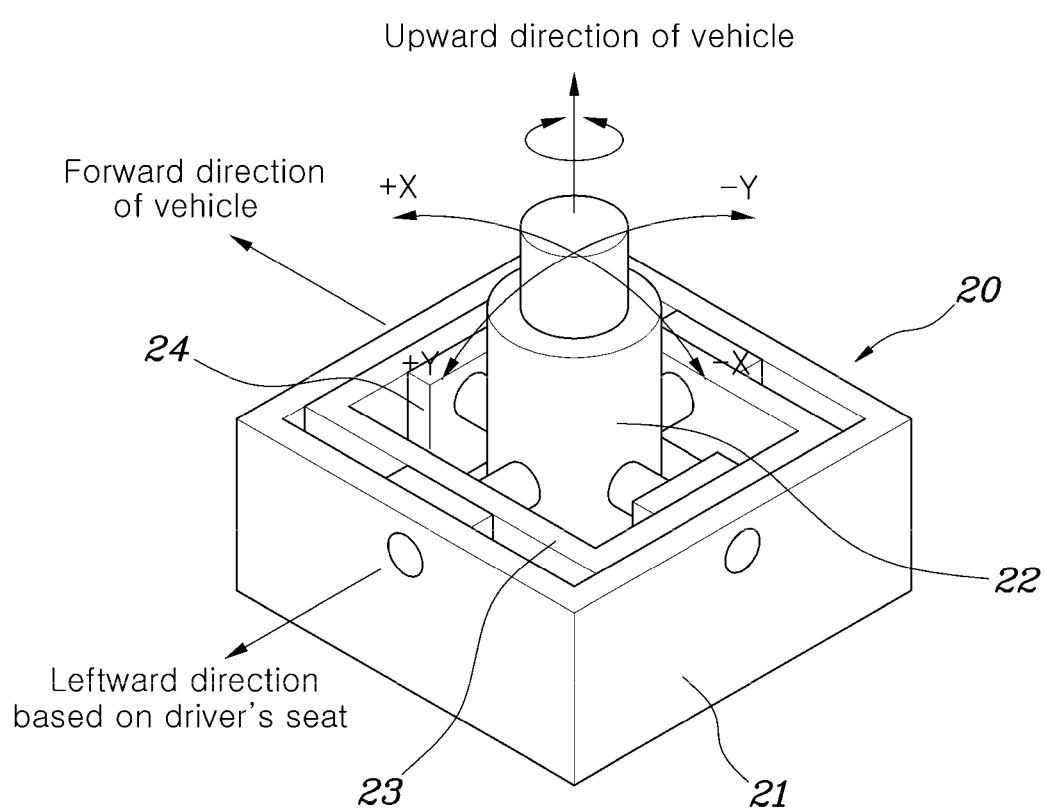
FIG. 6 is a perspective view showing a motion module according to an exemplary embodiment of the present disclosure.
Figure 7:
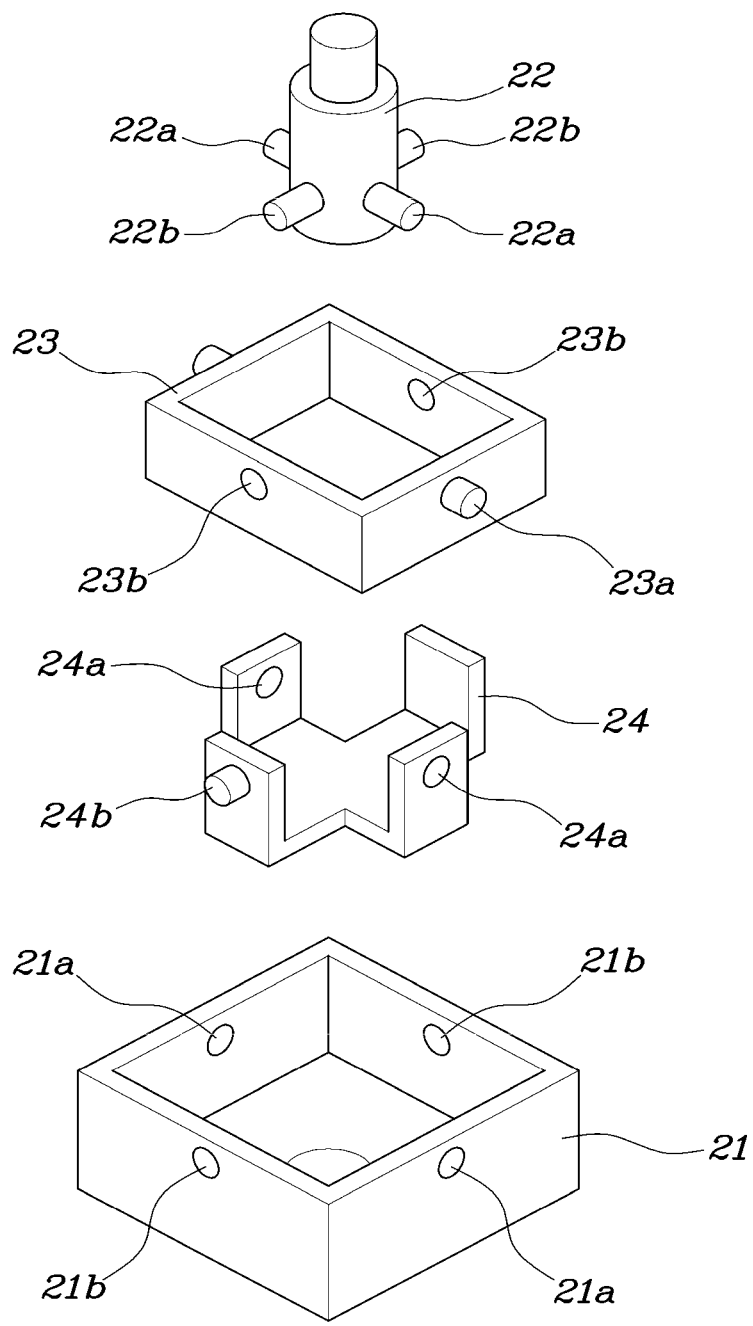
FIG. 7 is an exploded perspective view of the motion module according to an exemplary embodiment of the present disclosure.

FIG. 6 is a perspective view showing the motion module 20 according to an exemplary embodiment of the present disclosure. FIG. 7 is an exploded-perspective view showing the motion module 20 according to an exemplary embodiment of the present disclosure.

Referring to the drawing, the motion module 20 includes: a module housing 21 fixed to an upper end portion of the steering shaft 30; a first motion member 22 fixed to the lower end portion of the steering wheel 10 and achieving the steering motions; a second motion member 23 in which left and right portions of the first motion member 22 are inserted into left and right portions thereof, and front and rear portions thereof are inserted into front and rear portion of the module housing 21, the second motion member 23 allowing the forward and rearward pitching motion of the first motion member 22 with respect to the module housing 21; a third motion member 24 in which front and rear portion of the first motion member 22 are inserted into front and rear portions thereof, and left and right portions thereof are inserted into left and right portions of the module housing 21, the third motion member 24 allowing the leftward and rightward rolling motion of the second motion member 23 with respect to the module housing 21.

For example, an upper end portion of the first motion member 22 is securely coupled to the center portion of the lower end portion of the steering wheel 10. The upper end portion of the steering shaft 30 is securely coupled to the center portion of the bottom portion of the module housing 21.

Y-axis projections 22b that are projected in a cylinder shape on left and right portions of the first motion member 22 are inserted into Y-axis holes 23b that are formed on left and right portions of the second motion member 23. X-axis projections 23a that are projected in a cylinder shape on front and rear portions of the second motion member 23 are inserted into X-axis holes 21a that are formed on front and rear portions of the module housing 21. Accordingly, the leftward and rightward rolling motion may be implemented based on an X-axis.

Furthermore, X-axis projections 22a that are projected in a cylinder shape on front and rear portions of the first motion member 22 are inserted into X-axis holes 24a that are formed on front and rear portions of the third motion member 24. Y-axis projections 24b that are projected in a cylinder shape on left and right portions of the third motion member 24 are inserted into Y-axis holes 21b that are formed on left and right portions of the module housing 21. Accordingly, the forward and rearward pitching motion may be implemented on a Y-axis.

Through the motion module 20, the rolling motion, that is, leftward and rightward movement of a vehicle, and the pitching motion, that is, forward and rearward movement of a vehicle may be implemented.

For example, another structure allowing the steering motion in the same direction as the motion module 20 may be applied, and the structure may also be included within the scope of practice in an exemplary embodiment of the present disclosure.

Furthermore, as shown in FIG. 1, the system of the present disclosure includes a stopper 12 which is provided in a direction in which the steering wheel 10 performs the steering motion and prevents a collision between the steering wheel 10 and the motion module 20 during the steering motion process.

The stopper 12 may be formed in a rubber material, and be fixed to the internal surface of the lower end portion of the steering wheel 10 facing the module housing 21 of the motion module 20. In some case, the stopper 12 may be fixed to an external surface of the module housing 21.

As shown in FIG. 2, when the steering motion of the steering wheel 10 excessively occurs, a damage due to a collision between the magnetic bodies 11 and the magnetic field detectors 41 may be prevented.

Figure 8:
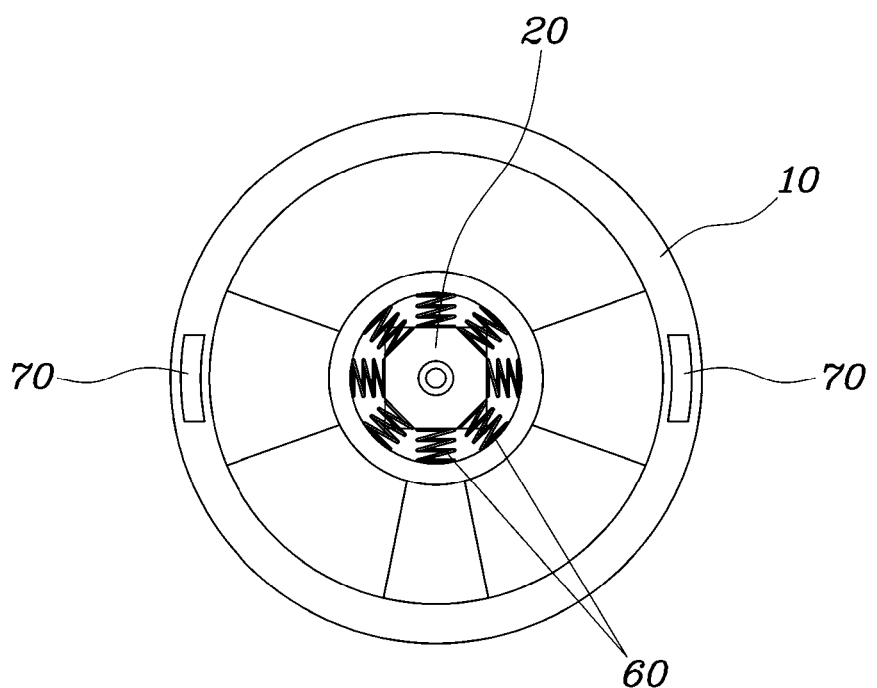
FIG. 8 is a view showing an arrangement example of motion switches and return springs according to an exemplary embodiment of the present disclosure.

FIG. 8 is a view showing an arrangement example of motion switches 70 and return springs 60 according to an exemplary embodiment of the present disclosure.

Referring to the drawings, the four-wheel independent steering system of the present disclosure includes the return springs 60 that provide an elastic restoring force in a direction in which the steering wheel 10 performs the steering motion.

A plurality of return springs 60 may be radially disposed between the steering wheel 10 and the motion module 20. The return springs 60 may be set with a high rigidity for assisting centering of the steering wheel 10.

Referring to FIG. 8, the present disclosure includes the motion switches 70 that activate the function of the steering motion. The controller CR may control the steering movement or the suspension movement of the four wheels 110 in response to the steering signal detected based on the steering motions while the function of the steering motion is activated.

The motion switches 70 may be provided on left and right portions of the steering wheel 10.

A driver pushes both the left and right motion switches 70 simultaneously or pushes one of the left and right motion switches 70, activating the function of the steering motion which is turned ON.

As described above, when the function of the steering motion is activated, a steering motion direction of the steering wheel 10 may be detected.

Figure 9:
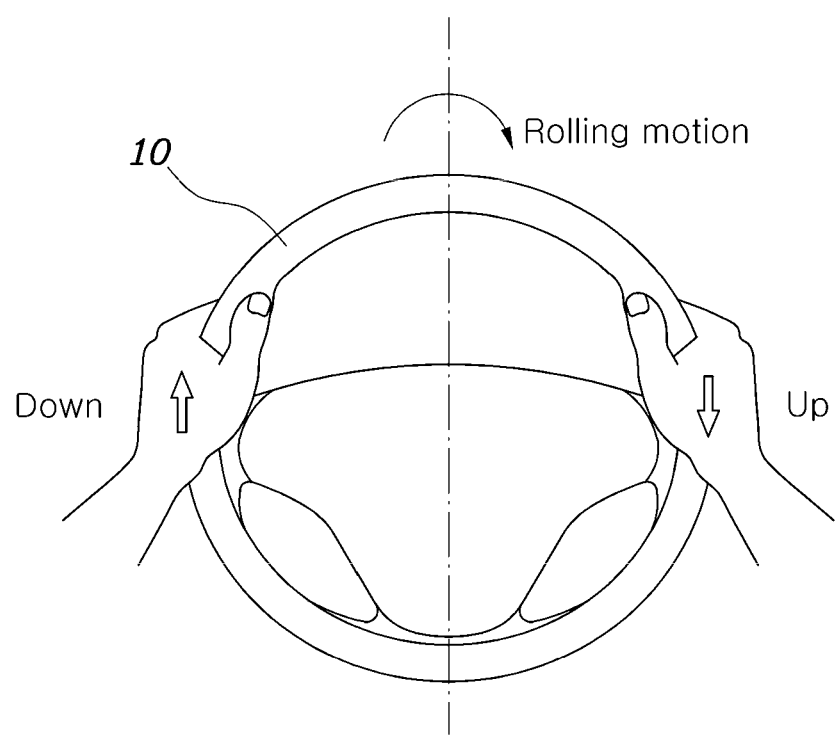
FIG. 9 is a view showing a steering motion in which the four wheels are steered in a 90° direction according to an exemplary embodiment of the present disclosure.
Figure 10:
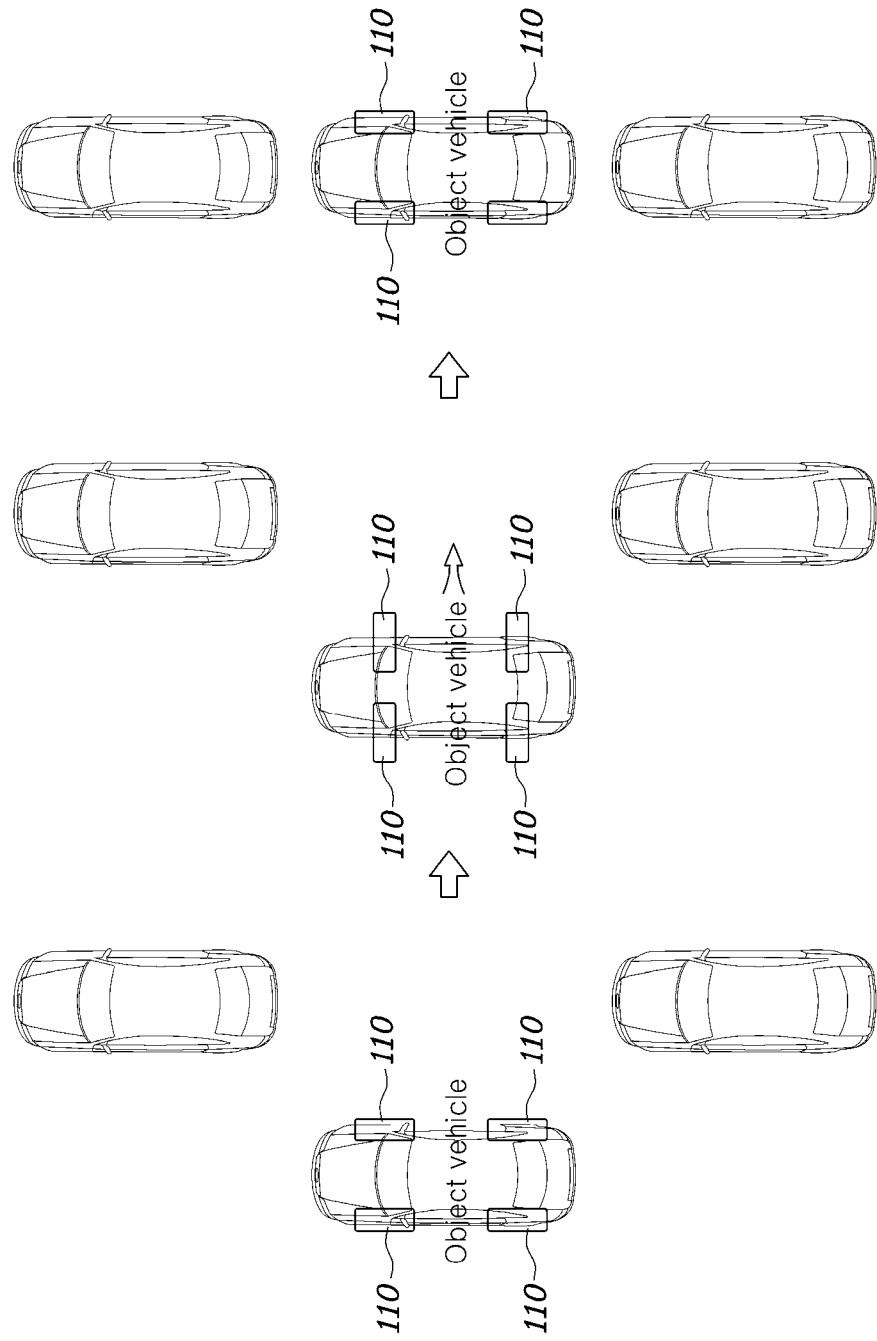
FIG. 10 is a view showing a steering movement of the four wheels and a vehicle state in response to the steering motion in FIG. 9.

FIG. 9 is a view showing the steering motion in which the four wheels 110 are steered in a direction of 90° according to an exemplary embodiment of the present disclosure. FIG. 10 is a view showing a steering movement of the four wheels 110 and a vehicle condition according to FIG. 9.

Referring to the drawing, when the steering wheel 10 performs the rolling motion in a left or right direction while the function of the steering motion is activated, the four wheels 110 are aligned leftward or rightward. When the function of the steering motion is deactivated, the four wheels 110 are restore-steered.

Figure 11A:
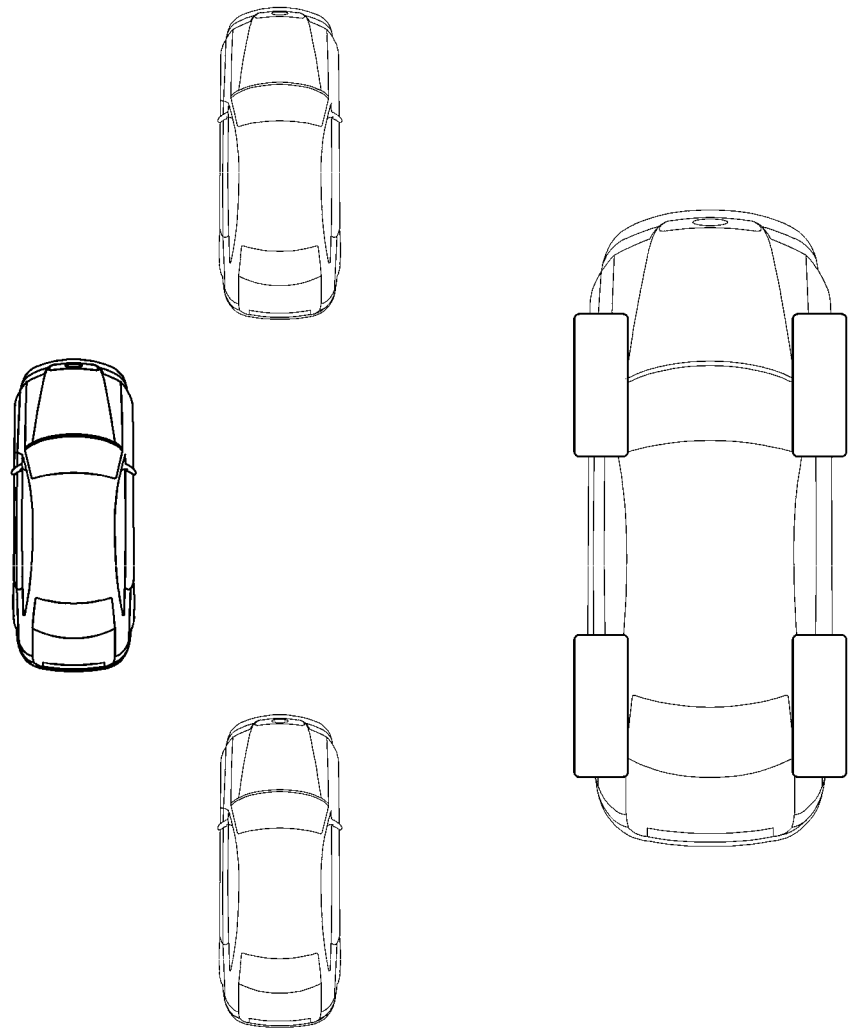
FIG. 11A and FIG. 11B are views showing screens displayed on a HUD in a function activation state and the steering motion operation state in FIG. 9.
Figure 11B:
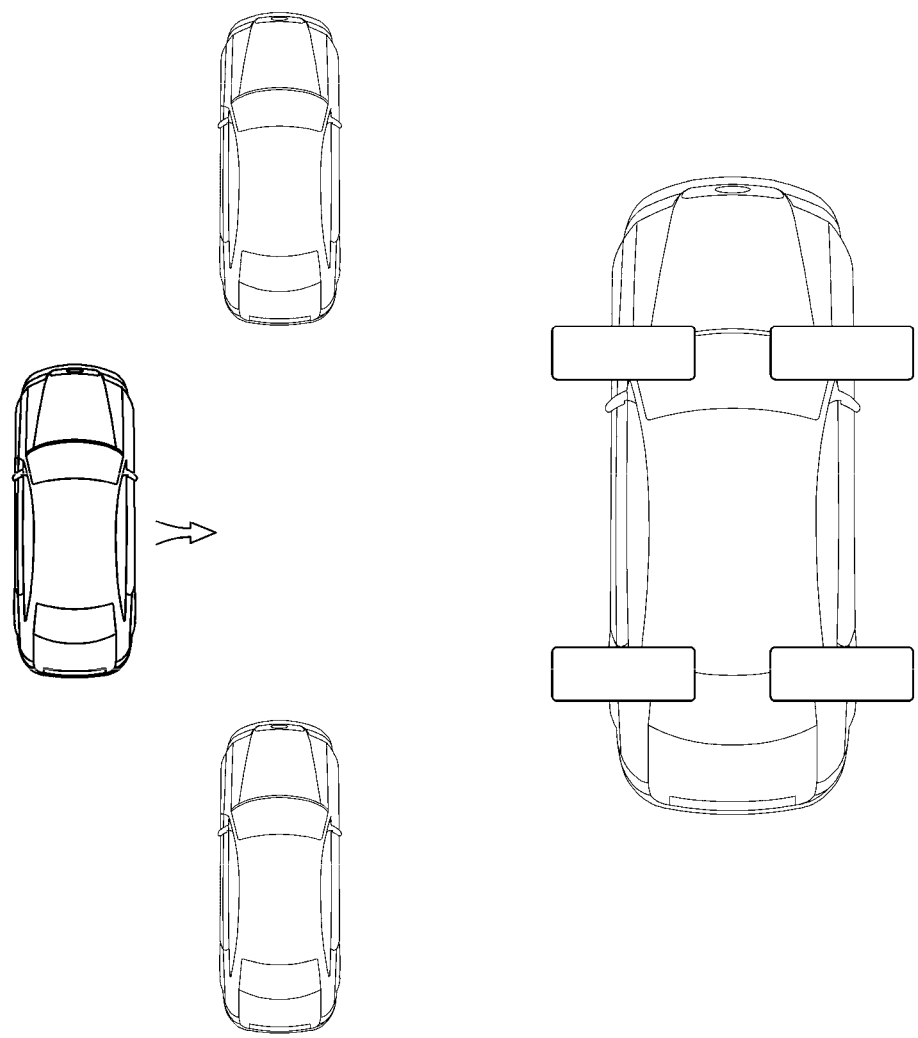

FIG. 11A and FIG. 11B are views showing screens displayed on a display device during a function activation and the steering motion operation in FIG. 9.

Referring to the drawings, in activation of the function of the steering motion, steering or suspension state of the four wheels 110 and vehicle driving state are displayed on the display device.

During the steering motion of the steering wheel 10, an expected steering or suspension state of the four wheels 110 and an expected vehicle driving state that reflect the steering motion are displayed on the display device.

For example, during the steering motion of the steering wheel 10, the technique that displays a vehicle condition on the display device is applied to all other steering motions, which will be described below.

The display device may be clustered with a head-up display (HUD), and may be a main center-fascia display, or a display device in which the cluster and Audio, Video, and Navigation (AVN) system/CID (center portion information display) are integrated with each other. The present disclosure may display images on the various display devices as described above. A method and a structure of displaying the images are also included in the scope of practice in an exemplary embodiment of the present disclosure.

When the motion switches 70 is operated into ON, as shown in FIG. 11A, a present state and a steering state of the four wheels 110 are displayed on the display device.

Accordingly, for a horizontal rightward movement of the vehicle as shown in FIG. 9, when the steering wheel 10 performs the rolling motion rightward, a result that reflects an intention of the steering motion is displayed on the display device as shown in FIG. 11B.

Accordingly, when a predetermined amount of time has elapsed or a separate operation is performed through the motion switches 70, the four wheels 110 are rotated at 90° as shown in FIG. 10.

When the driver steps on an accelerator pedal, the vehicle is moved rightward, and when moving is completed, the driver turns the motion switches 70 OFF to steer the four wheels 110 to be restored to pre −90° rotation state thereof.

Figure 12:
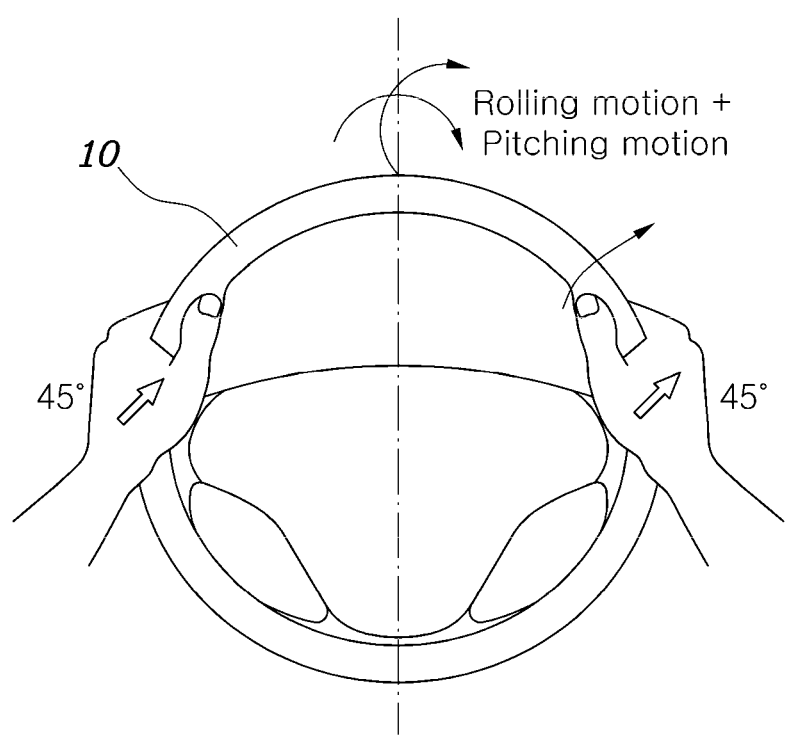
FIG. 12 is a view showing a steering motion in which the four wheels are steered in a 45° direction according to an exemplary embodiment of the present disclosure.
Figure 13:
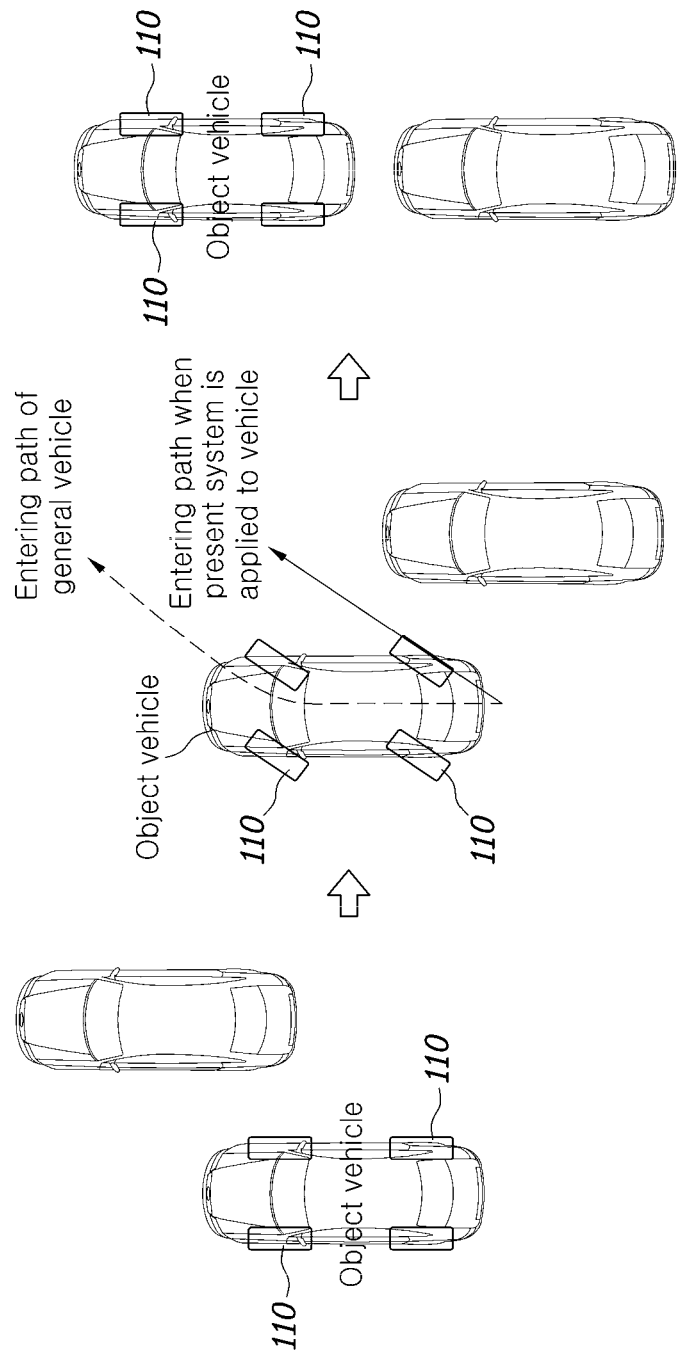
FIG. 13 is a view showing a steering movement of the four wheels and a vehicle state according to FIG. 12.
Figure 14A:
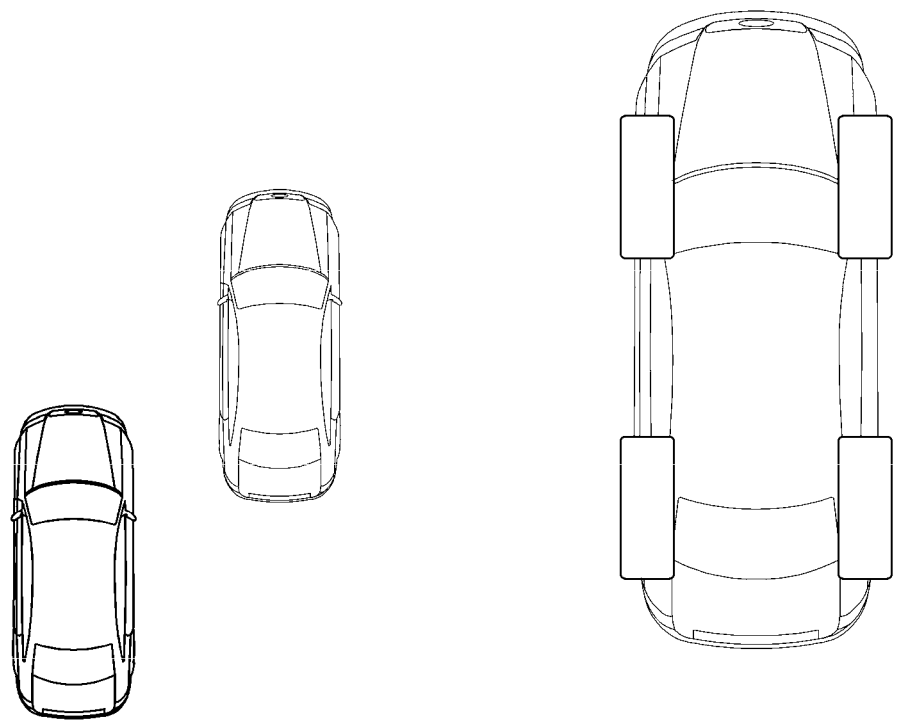
FIG. 14A and FIG. 14B are views showing screens displayed on the HUD in the function activation state and the steering motion operation state according to FIG. 12.
Figure 14B:
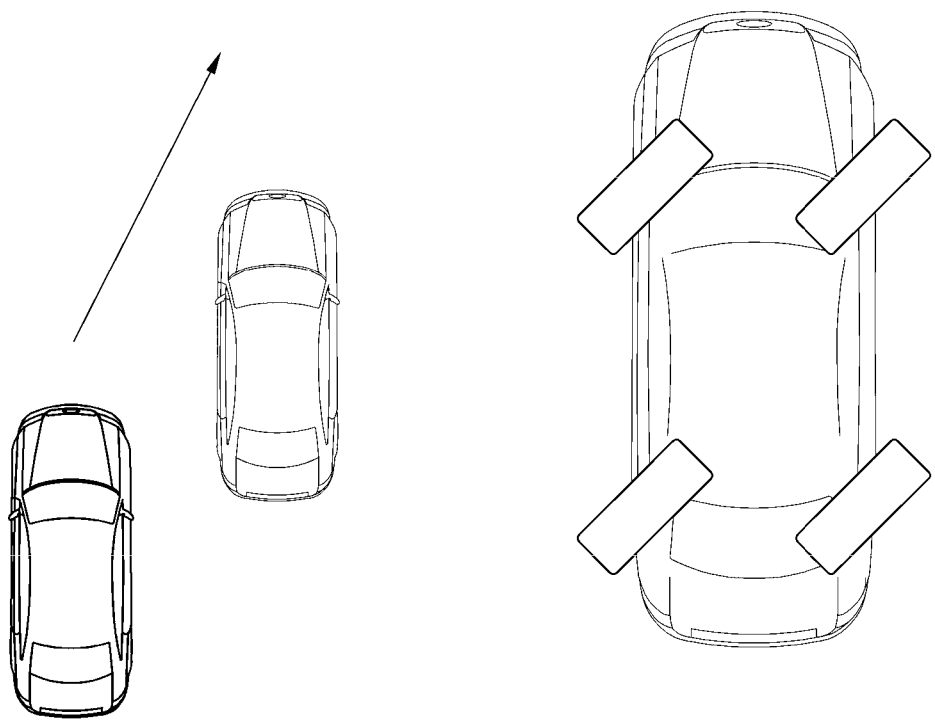

FIG. 12 is a view showing the steering motion steering the four wheels in a 45° direction according to an exemplary embodiment of the present disclosure. FIG. 13 is a view showing steering movement of the four wheels and a vehicle state according to FIG. 12. FIG. 14A and FIG. 14B are views showing screens displayed on the display device in the function activation and the steering motion operation according to FIG. 12.

Referring to the drawings, when the function of the steering motion is activated, the steering wheel 10 is operated in the rolling and pitching motions in a forward diagonal direction, the four wheels 110 are aligned in the diagonal direction. When the function of the steering motion is deactivated, the four wheels 110 are steered and restored to the initial alignment thereof.

When the motion switches 70 are operated into the ON state, as shown in FIG. 14A, a present state and a steering state of the four wheels 110 are displayed on the display device.

Accordingly, as shown in FIG. 12, for entering in a right direction of 45°, when the steering wheel 10 is operated in a forward right diagonal direction in which the rolling motion and the pitching motion are mixed, a result that reflects an intention of the steering motion is displayed on the display device as shown in FIG. 14B.

Accordingly, when a predetermined amount of time has elapsed or a separate operation is performed through the motion switches 70, the four wheels 110 are rotated at 45° as shown in FIG. 13.

When the driver steps on the accelerator pedal, the vehicle is moved right-forward, and when moving is completed, the driver turns the motion switches 70 OFF to steer the four wheels 110 to be restored to pre −45° rotation state thereof.

In the diagonal movement of the vehicle as described above, a moving path of the vehicle is significantly reduced compared to the conventional system. Therefore, in terms of being able to change lanes and pass faster, the system of the present disclosure may contribute improvement steering safety, turning safety, and fuel economy.

Figure 15:
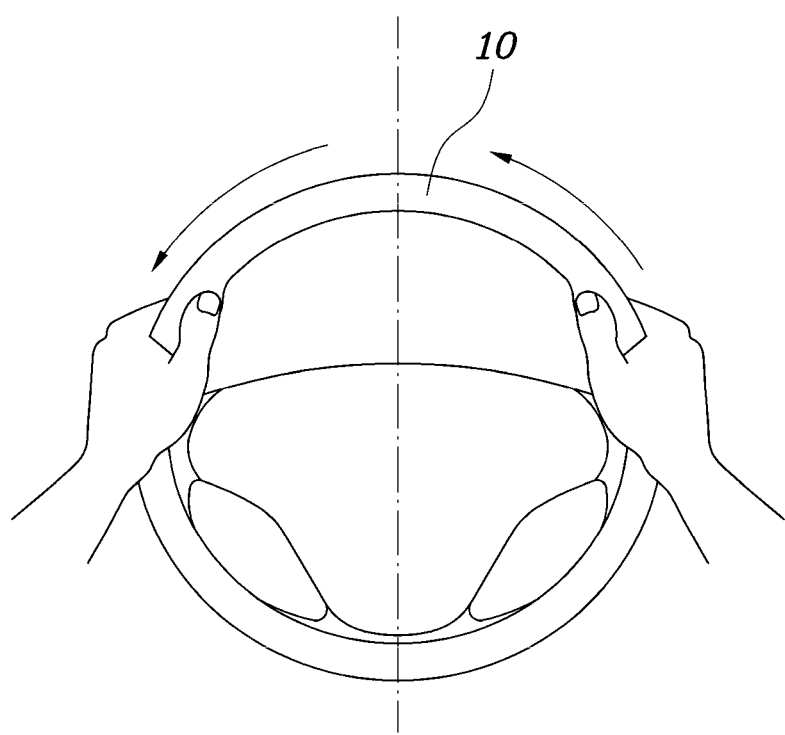
FIG. 15 is a view showing a steering motion in which the four wheels are steered in a ±45° direction according to an exemplary embodiment of the present disclosure.
Figure 16:
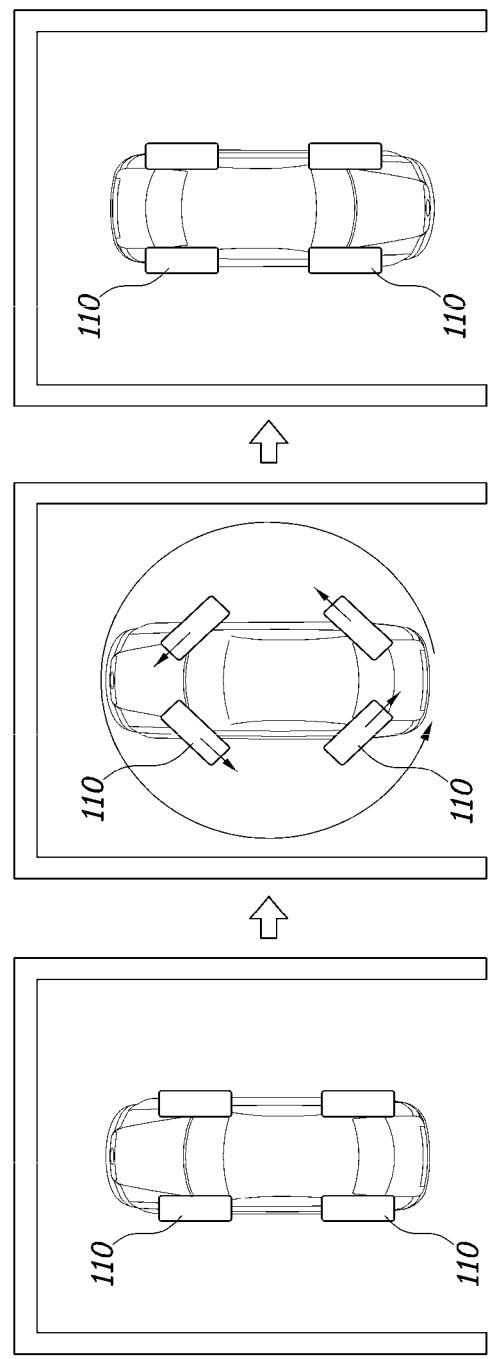
FIG. 16 is a view showing a steering movement and a vehicle state in response to the steering motion in FIG. 15.

Furthermore, FIG. 15 is a view showing the steering motion steering the four wheels in a ±45° direction according to an exemplary embodiment of the present disclosure. FIG. 16 is a view showing steering movement of the four wheels 110 and a vehicle state according to FIG. 15. FIG. 17A and FIG. 17B are views showing screens displayed on the display device in the function activation and the steering motion operation according to FIG. 15.

Referring to the drawings, when the steering wheel 10 is rotated while the function of the steering motion is activated, the vehicle is steered to be rotatable in place. When the function of the steering motion is deactivated, the four wheels 110 may be steered and restored to the initial alignment thereof.

For example, when front and rear wheelbases are the same and left and right wheel widths are the same, the four wheels 110 are steered in a direction of ±45°.

When the motion switches 70 are operated into the ON state, a present state and a steering state of the four wheels 110 are displayed on the display device as shown in FIG. 17A.

Accordingly, for achieving 180° rotation of the vehicle, as shown in FIG. 15, when the steering wheel 10 is operated to be rotated leftward, a result that reflects an intension of the function of the steering motion is displayed on the display device as shown in FIG. 17B.

Accordingly, when a predetermined amount of time has elapsed or a separate operation is performed through the motion switches 70, the four wheels 110 are rotated at ±45° as shown in FIG. 16.

When the driver steps on the accelerator pedal, the vehicle is rotated in place, and when the in-place-rotation is completed, the driver turns the motion switches 70 OFF to steer the four wheels 110 to be restored to pre ±45° rotation state thereof.

Figure 18:
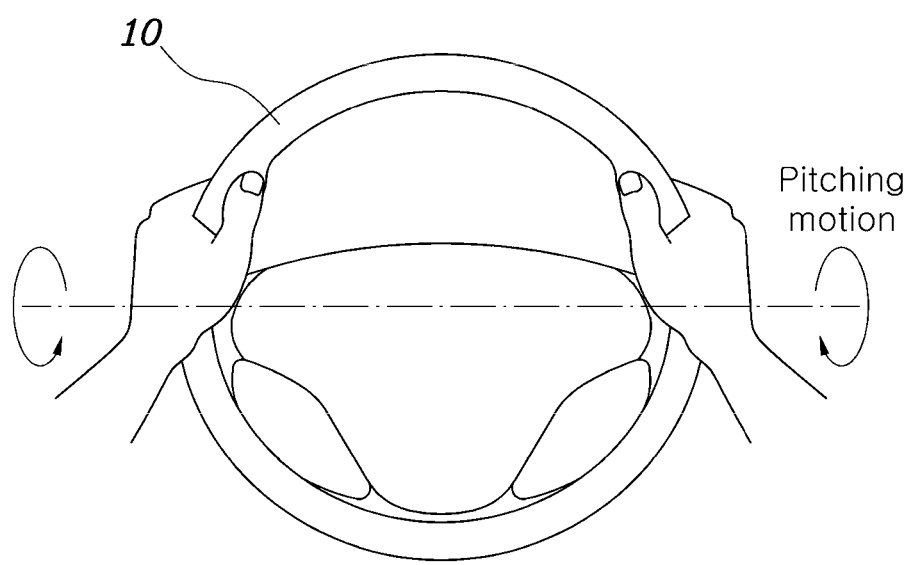
FIG. 18 is a view showing the steering motion by which a suspension is raised or lowered according to an exemplary embodiment of the present disclosure.
Figure 19:
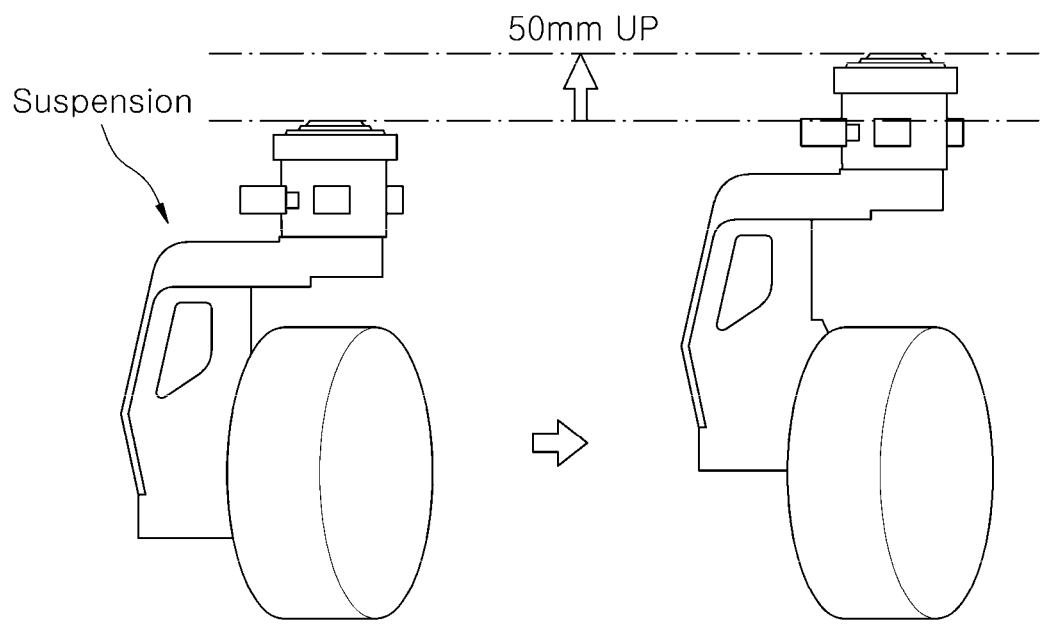
FIG. 19 is a view showing height adjustment of the suspension according to FIG. 18.
Figure 20A:
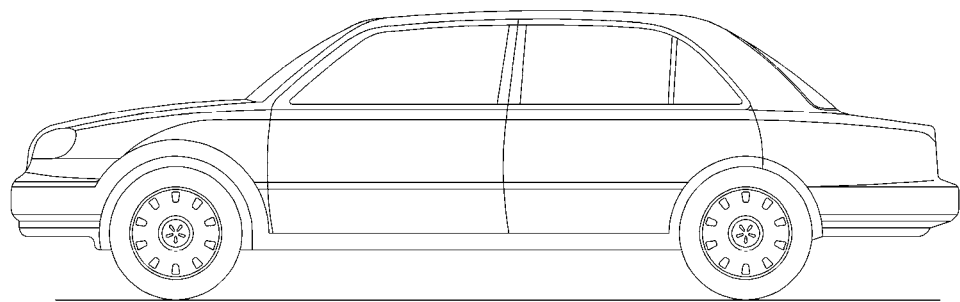
FIG. 20A and FIG. 20B are views showing screens displayed on the HUD in the function activation state and the steering motion operation state according to FIG. 18.
Figure 20B:
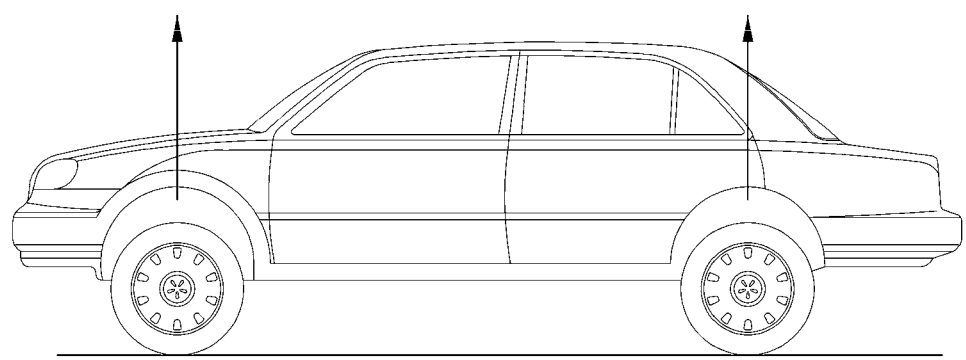

FIG. 18 is a view showing the steering motions that performs steering to raise or lower a suspension according to an exemplary embodiment of the present disclosure. FIG. 19 is a view showing height adjustment of the suspension according to FIG. 18. FIG. 20A and FIG. 20B are views showing screens displayed on the display device in the function activation state and the steering motions operation state according to FIG. 18.

Referring to the drawings, when the steering wheel 10 is operated in a rearward pitching motion while the function of the steering motion is activated, the suspension is raised to raise the vehicle ground clearance. When the steering wheel 10 is operated in a forward pitching motion while the function of the steering motion is activated, the suspension is lowered to lower the vehicle ground clearance.

For example, the suspension may be a suspension which is adjustable in height by a control command of the controller CR. When the controller CR of the present disclosure applies a signal required for the height adjustment of the suspension to a suspension controller, the suspension controller is configured to apply an operational command signal to the suspension so that the height of the suspension may be raised and lowered.

When the motion switches 70 are operated into the ON state, as shown in FIG. 20A, a present state of the vehicle is displayed on the display device.

Accordingly, for raising vehicle height, as shown in FIG. 18, when the steering wheel 10 is operated into the rearward pitching motion, a result that reflects an intension of the steering motion is displayed on the display device as shown in FIG. 20B.

Accordingly, when a predetermined amount of time has elapsed or a separate operation is performed through the motion switches 70, the suspension is raised by a predetermined height, and thus increases vehicle ground clearance.

Contrarily, when the steering wheel 10 is operated into the forward pitching motion, the suspension is lowered and thus reduces vehicle ground clearance again.

The present disclosure applies the function of the additional steering motion to a conventional steering to implement an interface technique for various vehicle movements such as a horizontal movement mode, a passing-to-next lane or turning mode, a rotation-in-place mode, a ground clearance change mode, etc., significantly improving the productivity of a vehicle.

As a steering state of the four wheels 110 and a vehicle driving state in response to the steering motion are displayed to the driver, so that it is possible to further improve the productivity of the vehicle.

Figure 21:
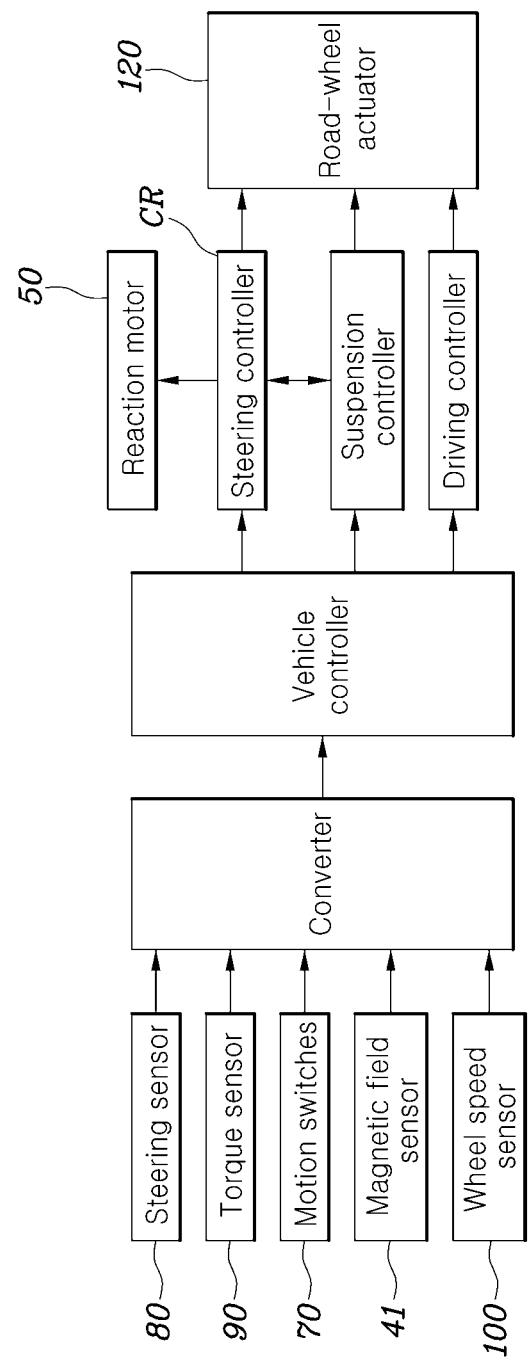
FIG. 21 is a block diagram showing a control system of the four-wheel independent steering system according to an exemplary embodiment of the present disclosure.

FIG. 21 is a block diagram showing a control system of the four-wheel independent steering system according to an exemplary embodiment of the present disclosure.

As shown in the drawing, through the steering detector 80, the torque detector 90, the motion switches 70, the magnetic field detector 41, the wheel speed detector 100, etc., an input signal that reflects a vehicle driving condition are detected, and the detected input signal is input into a converter. Accordingly, the signal is converted into a signal which may be processed in a vehicle control module through the converter and is transmitted to the vehicle control module.

The vehicle control module inputs information required for the steering controller CR, the suspension controller, and the driving controller. Based on the input information, each of the controllers generates a control command signal.

In response to a command generated by the controller CR of the present disclosure, the reaction motor 50 may be controlled, the suspension may be controlled, and the road-wheel actuators 120 may be controlled.

FIG. 21 is a flow chart entirely showing a control flow of the four-wheel independent steering system according to an exemplary embodiment of the present disclosure.

As shown in the drawing, the control flow of the four-wheel independent steering system of the present disclosure includes: determining, by the controller CR, whether the function of the steering motion of the steering wheel 10 is activated; detecting a steering signal, by the controller CR, when it is determined that the function of the steering motion is activated, detecting the steering signal corresponding to the steering motion including the rolling motion and the pitching motion of the steering wheel 10; controlling movement, by the controller CR, when the steering signal corresponding to the steering motion is detected, controlling the steering movement or the suspension movement of the four wheels 110 based on the detected steering signal.

While the driver operates the motion switches 70 ON to activate the function of the steering motion, in addition to rotation operation on the steering shaft 30, the steering wheel 10 is operated in the leftward and rightward rolling directions and the forward and rearward pitching direction, implementing the steering motion. Then the steering signal corresponding to the steering motion is detected to control the vehicle movement.

Therefore, the steering operation for generating various vehicle movements is implemented by the activation of the function of the steering motion, the additional steering operation of the steering wheel 10. Accordingly, the interface suitable for the four-wheel independent steering system is implemented to improve the convenience in steering operation and the productivity of a vehicle.

For example, the controller CR according to the exemplary embodiment of the present disclosure may be implemented by a nonvolatile memory, which includes an algorithm configured to control operations of various components of a vehicle or data regarding software instructions to play the algorithm, and a processor, which is configured to perform operations described below using the data stored in the memory. The memory and processor may be implemented as separate chips. Alternatively, the memory and processor may be implemented as single chips integrated with each other. The processor may take the form of one or more processors.

In the activation of the function of the steering motion, steering or suspension state of the four wheels 110 and vehicle driving state may be displayed on the display device.

When the steering wheel 10 performs the steering motion while the function of the steering motion is activated, an expected steering or suspension state of the four wheels 110 and an expected vehicle driving state that reflect the steering motion may be displayed on the display device.

When the images are displayed on the HUD as the display device, information related to navigation system, self-driving, rider and radar, ground clearance of the suspension, vehicle speed, driving torque, and steering.

The detecting the steering signal is performed by detecting the steering signal based on a magnetic field change detected by the magnetic field detector 41 in response to a distance change between the magnetic body 11 and the magnetic field detector 41 occurring by the steering motions of the steering wheel 10.

The detecting the steering signal includes: securing, by the magnetic field detector 41 fixed to the steering column 40, the magnetic field strength of the magnetic bodies 11 provided in the steering wheel 10; and detecting a steering signal, wherein in the steering motion of the steering wheel 10, detecting a steering signal corresponding to the steering motion based on a steering angle and a change in the magnetic field strength of the magnetic body 11.

Furthermore, the steering signal with respect to the steering motion may be detected by the steering motion magnetic field map.

When the function of the steering motion is deactivated, it may be controlled so that the steering signal with respect to the steering motion is not detected.

Figure 22:
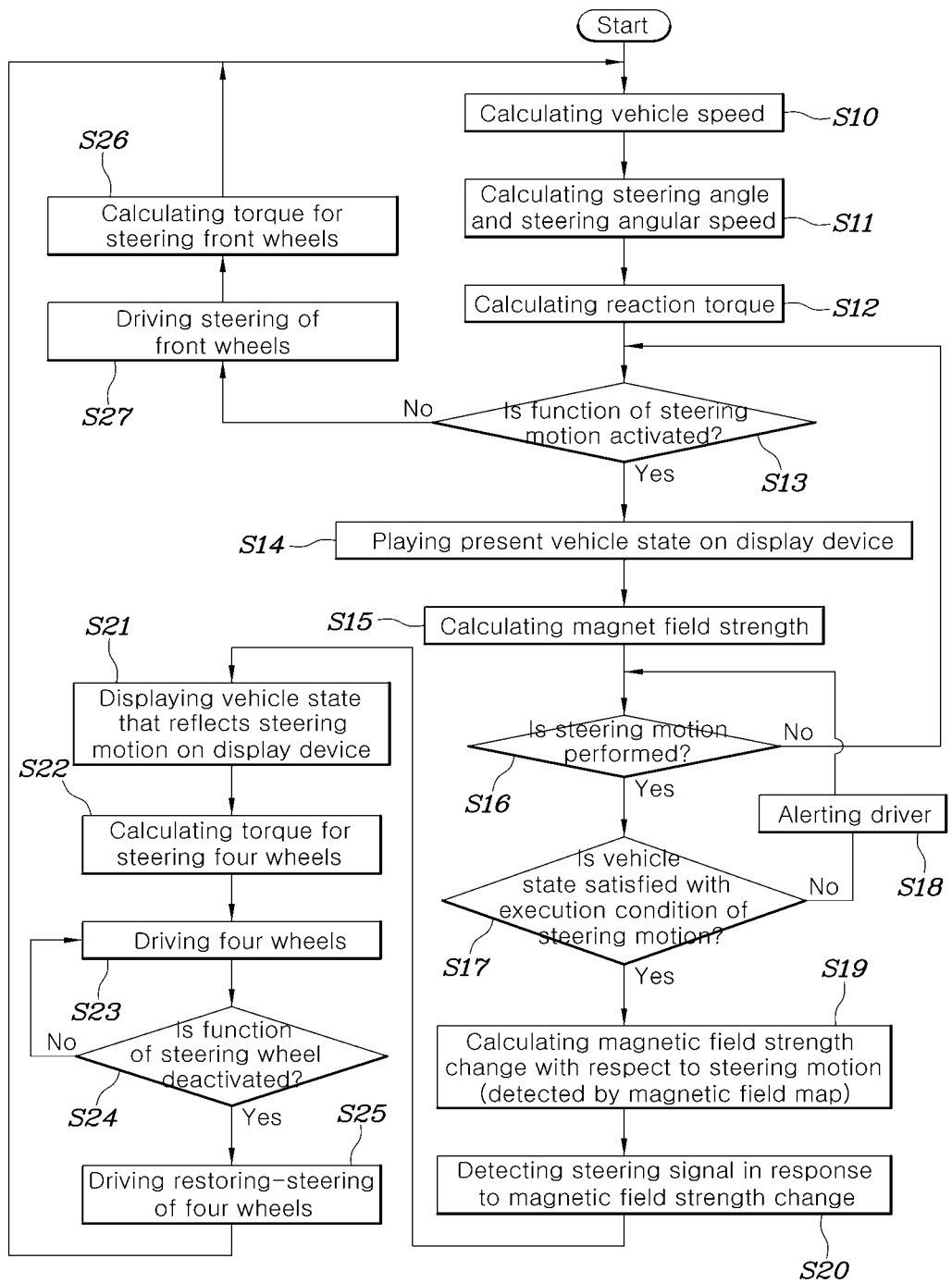
FIG. 22 is a flowchart showing a whole control flow of the four-wheel independent steering system according to an exemplary embodiment of the present disclosure.

Hereinbelow, referring to FIG. 22, a whole process of controlling the four-wheel independent steering system according to an exemplary embodiment of the present disclosure will be described.

In the vehicle driving process, a vehicle speed is determined by receiving the information of the wheel speed detector 100 and the information of the navigation at S10.

A steering angle and a steering angular speed are secured through the steering detector 80 at S11.

Based on the determined vehicle speed, a steering angle, and steering angular speed, the reaction torque is determined, and the determined reaction torque is supplied to the steering wheel 10 through the reaction motor 50 at S12.

In the above vehicle driving process, operation of the motion switches 70 is determined to determine whether the function of the steering motion is activated at S13.

When it is determined that the function of the steering motion is activated as a determination result at S13, a present steering or suspension state of the four wheels 110 and a present vehicle driving state are displayed on the display device at S14.

The magnetic field strength of each of the magnetic bodies 11 is determined using the magnetic field detectors 41 at S15.

When steering operation of the driver is monitored at S16, and the steering motion of the steering wheel 10 performs in the monitoring process, it is determined whether a condition of the vehicle satisfies the condition for executing the steering motion the vehicle condition S17.

For example, when the driver performs the horizontal mode or the rotation-in-place mode of the vehicle by the steering motion, it may be determined that the execution condition of the steering motion is satisfied when the vehicle stops. Otherwise, a vehicle state, which is essential to vehicle safety when the four wheels 110 are driven for each steering motion, may be set as the execution condition of the steering motion.

As a determination result at S17, when the execution condition of the steering motion is not satisfied, inability to steer with respect to the steering motion is alerted to the driver via the HUD or instrument board, so that the driver changes a vehicle condition to a state that satisfies the execution condition of the steering motion at S18.

On the other hand, as a determination result at S17, when the execution condition of the steering motion is satisfied, the magnetic field change which is detected by the magnetic field detectors 41 in response to a distance change between the magnetic bodies 11 and the magnetic field detectors 41 caused by the steering motion of the steering wheel 10 is detected by the magnetic field map at S19.

The steering signal with respect to the steering motion is detected based on the magnetic field change, the steering angle, and the operation input of the motion switches 70 at S20.

An expected steering or suspension state of the four wheels 110 or an expected vehicle driving state that reflect the steering motion are displayed on the display device S21.

The steering torque of the road-wheel actuators 120 for steering the four wheels 110 is determined based on a vehicle speed, steering angle, and steering angular speed at S22. The steering torque may be set differently for each steering motion.

The road-wheel actuators 120 steers each of the four wheels 110 independently, at S23.

It is determined whether the function of the steering motion is deactivated by determining operation of the motion switches 70, at S24.

As a determination result at S24, when the function of the steering motion is deactivated, the four wheels 110 are restore-steered into a state before the four wheels are rotated, at S25.

As a determination result at S13, when the function of the steering motion is deactivated, a steering torque of the road-wheel actuators 120 for steering the front wheel is determined based on a vehicle speed, steering angle, steering angular speed, at S26.

The front wheels are steered by the road-wheel actuators 120 operating the front wheels, at S27.

As described above, according to an exemplary embodiment of the present disclosure, the steering operation for forming various vehicle movements are implemented by the additional steering operation such as the rolling motion and the pitching motion of the steering wheel. Therefore, the interface suitable for the four-wheel independent steering system is implemented, and thus improves the convenience of the steering operation and the productivity of a vehicle.

A steering state of the four wheels and a vehicle state that reflect the steering motion are displayed for the driver, whereby the productivity of a vehicle is further improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A four-wheel independent steering system comprising:
a motion module configured for implementing steering motions by a tilting operation of a steering wheel in a forward direction of a vehicle, wherein the steering motions include at least one of a rolling motion and a pitching motion of the steering wheel with respect to a steering column;
a controller configured to detect a steering signal corresponding to one of the steering motions, and to control steering movement or suspension movement of four wheels based on the detected steering signal; and magnetic bodies provided in one of the steering wheel and the steering column and magnetic field detectors provided in another of the steering wheel and the steering column, wherein the magnetic bodies and the magnetic field detectors are disposed to be adjacent to each other, wherein the magnetic field detectors are fixed to an external surface of the steering column, and wherein the magnetic bodies are provided on an internal surface of a lower end portion of the steering wheel, encompassing the magnetic field detectors.

2. The four-wheel independent steering system of claim 1, further including:

wherein the controller is configured to detect the steering signal based on a magnetic field change detected by the magnetic field detectors in response to a distance change between the magnetic bodies and the magnetic field detectors caused by the steering motions of the steering wheel.

3. The four-wheel independent steering system of claim 2, wherein the magnetic bodies and the magnetic field detectors respectively include at least two magnetic bodies and two magnetic field detectors in a circumferential direction based on a shaft of the steering wheel and the steering column.

4. The four-wheel independent steering system of claim 3, wherein all the magnetic bodies have different sizes from each other.

5. The four-wheel independent steering system of claim 1, wherein the motion module is disposed between the steering wheel and a steering shaft and connected to the steering wheel and the steering shaft while relative rotation of the motion module is restricted; and wherein the steering shaft includes a reaction motor to supply a reaction torque to the steering wheel.

6. The four-wheel independent steering system of claim 1, wherein the motion module includes:

a module housing fixed to an upper end portion of the steering shaft;

a first motion member fixed to a lower end portion of the steering wheel to implement the steering motions;

a second motion member in which left and right portions of the first motion member are inserted into left and right portions thereof and front and rear portions thereof are inserted into front and rear portion of the module housing, allowing a forward and rearward pitching motion of the first motion member with respect to the module housing; and a third motion member in which front and rear portions of the first motion member are inserted into front and rear portions thereof, and left and right portions thereof are inserted into left and right portions of the module housing, allowing a leftward and rightward rolling motion of the second motion member with respect to the module housing.

7. The four-wheel independent steering system of claim 1, further including:

a stopper provided in a direction in which the steering wheel performs the steering motion for preventing a collision between the steering wheel and the motion module during a steering motion process of the steering wheel.

8. The four-wheel independent steering system of claim 1, further including:

return springs configured to provide an elastic restoring force in a direction in which the steering wheel performs the steering motion.

9. The four-wheel independent steering system of claim 8, wherein the return springs are connected to the steering wheel and the motion module while being located therebetween.

10. The four-wheel independent steering system of claim 1, further including:

motion switches configured to activate a function of one of the steering motions, wherein the controller is configured to control the steering movement or the suspension movement of the four wheels in response to the steering signal detected due to the steering motion while the function of the steering motion is activated.

11. The four-wheel independent steering system of claim 10, wherein the motion switches are provided at left and right portions of the steering wheel.

12. The four-wheel independent steering system of claim 10, wherein, among the steering motions, in a steering motion in which the steering wheel is operated in leftward and rightward rolling motions while the function of the steering motion is activated, the four wheels are aligned leftward and rightward; and when the function of the steering motion is deactivated, the four wheels are steered and restored to an initial alignment thereof.

13. The four-wheel independent steering system of claim 10, wherein, among the steering motions, in a steering motion in which the steering wheel is operated in rolling and pitching motions in a forward diagonal direction while the function of the steering motion is activated, the four wheels are aligned in the forward diagonal direction; and when the function of the steering motion is deactivated, the four wheels are steered and restored to an initial alignment thereof.

14. The four-wheel independent steering system of claim 10, wherein, when the steering wheel is rotated while the function of the steering motion is activated, the four wheels are steered to enable the vehicle to be rotated in place; and when the function of the steering motion is deactivated, the four wheels are steered and restored to an initial alignment thereof.

15. The four-wheel independent steering system of claim 10, wherein, among the steering motions, in a steering motion in which the steering wheel is operated in the pitching motion in a first direction while the function of the steering motion is activated, a suspension is raised and thus increases vehicle ground clearance; and among the steering motions, in a steering motion in which the steering wheel is operated in the pitching motion in a second direction while the function of the steering motion is activated, the suspension is lowered and thus lowers the vehicle ground clearance.

16. The four-wheel independent steering system of claim 10, wherein, when the function of the steering motion is activated, a present steering or suspension state of the four wheels and a vehicle driving state are displayed on a display device.

17. The four-wheel independent steering system of claim 10, wherein, in the steering motion of the steering wheel, an expected steering or suspension state of the four wheels and an expected vehicle driving state that reflect the steering motion are displayed on a display device.

18. A method of controlling the four-wheel independent steering system of claim 1, the method comprising:

determining, by the controller, whether a function of the steering motions is activated;

detecting the steering signal, by the controller, wherein when the function of the steering motions is determined to be activated, the steering signal in response to the steering motions occurring by the tilting operation of the steering wheel is detected;

controlling a movement, by the controller, wherein when the steering signal is detected due to the steering motions, the steering movement or the suspension movement of the four wheels is controlled based on the detected steering signal.

19. The method of claim 18, wherein when the function of the steering motions is activated, the controller is configured to display a present steering or suspension state of the four wheels and a vehicle driving state on a display device.

20. The method of claim 18, wherein, in the steering motions of the steering wheel while the function of the steering motions is activated, the controller is configured to display an expected steering or suspension state of the four wheels and an expected vehicle driving state that reflect the steering motions on the display device.

21. The method of claim 18, wherein the detecting the steering signal is performed by detecting, by the controller, the steering signal based on a magnetic field change detected by a magnetic field detector in response to a distance change between the magnetic bodies and the magnetic field detectors caused by the steering motions of the steering wheel.

22. The method of claim 18, wherein the detecting the steering signal includes:

acquiring, by the magnetic field detectors fixed to the steering column, magnetic field strength of the magnetic bodies provided in the steering wheel; and detecting the steering signal, by the controller, from the steering motions of the steering wheel, wherein, detecting the steering signal corresponding to the steering motions is based on a steering angle and a magnetic field strength change of the magnetic bodies.

23. The method of claim 22, wherein the controller is configured to detect the steering signal with respect to the steering motions by a steering motion magnetic field map.

24. The method of claim 18, wherein, when the function of the steering motions is deactivated, the controller does not detect the steering signal with respect to the steering motions.

25. A four-wheel independent steering system comprising:

a motion module connected to a steering wheel and a steering shaft while being disposed therebetween and restricting relative rotation thereof, and configured to implement steering motions by a tilting operation of the steering wheel in a forward direction of a vehicle;

a steering column encompassing the steering shaft;

magnetic bodies provided at one of the steering wheel and the steering column and magnetic field detectors provided at another of the steering wheel and the steering column, wherein the magnetic bodies and the magnetic field detectors are adjacent to each other; and a reaction motor provided at the steering shaft to provide a reaction torque to the steering wheel, wherein the magnetic field detectors are fixed to an external surface of the steering column, and wherein the magnetic bodies are provided on an internal surface of a lower end portion of the steering wheel, encompassing the magnetic field detectors.

* * * * *